June 10, 1958 R. A. STUMM, JR 2,838,072
TEMPERATURE COMPENSATED DEVICE FOR ABSORBING
TRANSIENT PRESSURE FLUCTUATIONS
Filed Feb. 7, 1955
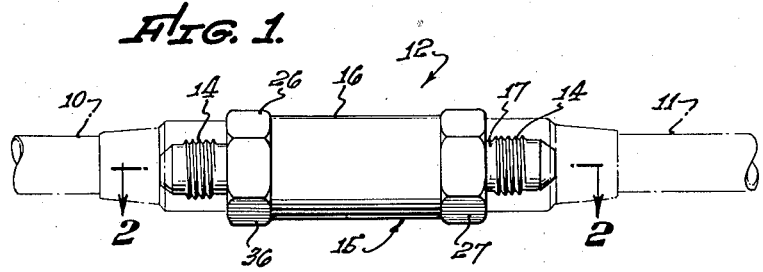
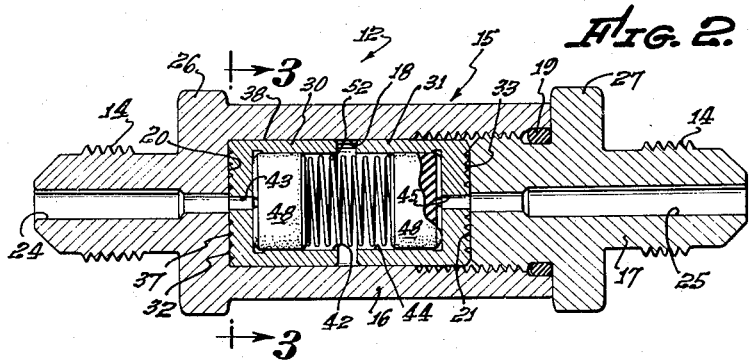
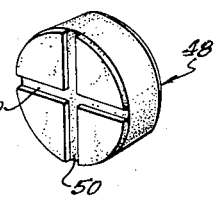
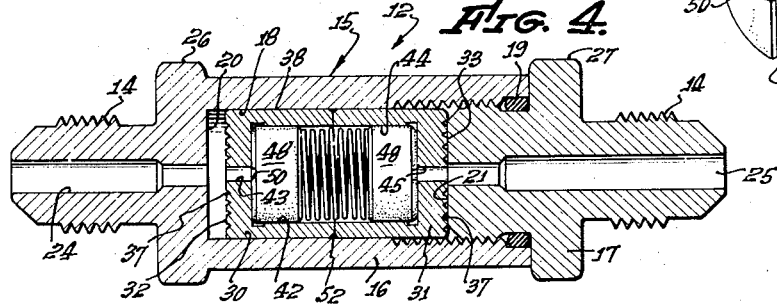
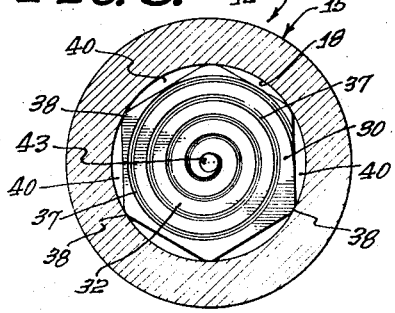
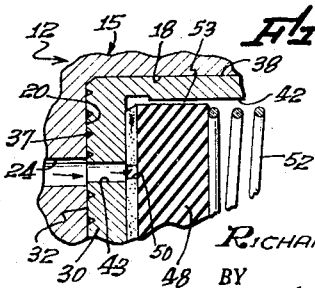
INVENTOR.
RICHARD A. STUMM, JR.
BY
Knight + Rodgers
ATTORNEYS United States Patent Office 2,838,072
Patented June 10, 1958

2,838,072

TEMPERATURE COMPENSATED DEVICE FOR ABSORBING TRANSIENT PRESSURE FLUCTUATIONS

Richard A. Stumm, Jr., Pasadena, Calif., assignor to Sterer Engineering & Manufacturing Company, North Hollywood, Calif., a partnership Application February 7, 1955, Serial No. 486,660

3 Claims. (Cl. 138—26)

This invention relates generally to improvements in devices for regulating fluid flow; and more particularly to devices of this class which incorporate means for compensating for the increased resistance to fluid flow encountered at low temperatures as a result of the increase in viscosity of the oil or similar liquid in the line.

Devices of this general character are used wherever it is desired to damp or throttle fluctuations of brief duration in the fluid pressure transmitted within a conduit. A particular use is the prevention of high pressure surges which sometimes occur in such fluid pressure lines. Devices used for this purpose are commonly referred to as surge dampeners or pressure snubbers. For this reason, snubbers are often found in lines leading to gages or other pressure responsive instruments which need to be protected against damages resulting from suddenly applied hydraulic loads or when it is desired to dampen the pressure fluctuations so as to steady the movement of the indicator.

Flow regulators of this character interpose a high degree of restriction into the flow path of the hydraulic fluid. Among other factors which determine the rate of flow past this restriction, is the viscosity of the hydraulic fluid, and this in turn is normally a function of temperature. Consequently a degree of restriction which may be quite satisfactory at ordinary atmospheric temperatures may be found to impose such a high degree of restriction at very low temperatures as to be entirely unsuitable. This is particularly true of hydraulic systems which are subjected to a comparatively wide range of working temperatures, reaching temperatures well below 0° F.

Consequently it is the general object of the present invention to provide a device of the above mentioned character which changes the total restriction imposed upon liquid flow to such an extent and at such a rate that the device automatically compensates for an increase in the viscosity of the hydraulic fluid at low temperatures.

It is a further object of the invention to provide a fluid flow regulator of the character described which includes auxiliary flow restricting passage means which provides increased fluid flow through the device at low temperatures in order to compensate for the effects of relatively low temperatures upon the operation of the device.

A flow regulator constructed according to my invention has a body defining an internal chamber that is connected at opposite ends to fluid passages through which fluid enters and leaves the chamber. Within the chamber is located suitable means for imposing a continuous primary restriction upon the flow of fluid. In a preferred embodiment of my invention, this means is in the form of a pair of opposed pistons between which is located suitable yielding means which urges the pistons against opposite ends of the chamber. Thus each piston is adapted to reciprocating movement toward and away from one of the fluid passage openings in the chamber but is normally urged to a position against the end wall of the chamber around the associated opening. A primary restricted passage is formed by a groove in the end face of the piston and by the abutting portion of the chamber wall to allow a limited flow of the fluid across the ends of the piston and into the opening in the wall.

Within each of the pistons there is located an axially extending secondary fluid passage which is normally closed by a plug of a material having a comparatively high coefficient of thermal expansion. Such a material may be one of the synthetic resins, or plastics, now marketed under the trade name "Teflon." At extremely low temperatures, this plug shrinks away from the piston sufficiently to open up the auxiliary path of fluid flow around the plug and through the piston. The plug is means for imposing an intermittent restriction on flow of fluid. This auxiliary path is open only at relatively low temperatures and is large enough to compensate for the reduced flow of liquid through the first mentioned restricted passage resulting from the increase in viscosity at the lower temperatures. The spring means urging the pistons away from each other preferably seats against this plug in order to hold this plug in place at low temperatures. At normal atmospheric temperatures, the plug is held in place by engagement with the surrounding portion of the piston, thus preventing any fluid flow past the plug.

Because the present invention has been developed for use in a snubber of the type disclosed in co-pending application Serial Number 402,964 of Bernard F. Scherer, filed January 8, 1954, on "Device for Absorbing Transient Pressure Fluctuations," now Patent No. 2,804,093, it is shown and described herewith in that embodiment. However, it is to be understood that the present invention is not necessarily limited thereto.

How the above objects and advantages of my invention, as well as others not specifically referred to herein, are attained will become more readily apparent from the following description and to the annexed drawings, in which:

Fig. 1 is a side elevation of a pressure snubber constructed according to my invention inserted in a hydraulic line;

Fig. 2 is a longitudinal median section through the snubber on line 2—2 of Fig. 1;

Fig. 3 is a transverse section on line 3—3 of Fig. 2 showing a preferred form of the primary and secondary restricted fluid passage means;

Fig. 4 is a view similar to Fig. 2 showing the parts in an alternative position;

Fig. 5 is a perspective view of the temperature compensating plug removed from the rest of the apparatus; and Fig. 6 is an enlarged fragmentary section showing the fluid passage opened as when the temperature compensating plug is reduced in diameter at low temperatures.

Referring now to the drawings, 10 and 11 are sections of an hydraulic line between which is interposed the pressure snubber indicated generally at 12. In order to facilitate connection to an hydraulic line, the snubber is provided with externally threaded end portions 14, as shown in Fig. 2, although any other suitable means may be provided on the snubber for effecting connection thereto of an hydraulic line.

The snubber 12 includes a body 15 which is formed in two parts, a main body section 16 and a cap 17. Body section 16 is provided with an internal bore 18 which is internally threaded at one end in order to receive the externally threaded portion of cap 17. A fluid-tight joint between body 16 and cap 17 is assured by packing ring 19. Bore 18 may be formed in any suitable manner, as by drilling into one end of the main body section 16, the inner end of the bore forming one end wall 20 of the internal chamber. When cap 17 is screwed in place, the other end of internal chamber 18 is formed by the inside end face 21 of the cap.

Each part 16 and 17 of body 15 is provided with a bore 24 and 25 respectively which extends entirely through the body section and communicates with internal chamber 18 at one end thereof. Each bore 24 and 25 also communicates with one of sections 10 and 11 respectively of the fluid line in which the snubber is inserted. Bores 24 and 25 are preferably coaxial with bore 18.

It is preferable to provide each part 16 and 17 of the body with a section having a plurality of flat external surfaces, as indicated at 26 and 27 respectively, in order that the two parts of the body may be engaged by a wrench, either for tightening the parts relative to each other or for connecting the snubber to sections 10 and 11 of the fluid conduit.

Located within chamber 18 are a pair of hollow cup-like members or pistons 30 and 31 which are oppositely disposed so that their end surfaces face outwardly away from each other and their hollow ends face toward each other. These piston members are slidably mounted within chamber 18 and are capable of limited reciprocation within the chamber. The outer end face 32 of piston 30 is adapted to engage or abut end wall 20 of chamber 18. In a similar manner, end face 33 of piston 31 is adapted to engage or abut end wall 21 of chamber 18. As shown in the drawings, the end walls of the chamber and the abutting end walls of the pistons preferably have flat surfaces, since flat surfaces can most easily be made accurate and true to shape. However, other shapes may be used as long as each pair of abutting faces is of complementary shapes so that they are in contact over their abutting areas, except as noted below.

Each end face 32 or 33 of the two pistons is provided with a spiral groove 37, which may be V-shaped as shown in Fig. 6, or may have any other suitable cross section. This groove extends from the center to the perimeter of the piston, the inner end of each groove 37 registering with the associated bore 24 or 25. Grooves 37 are preferably made of spiral configuration in order to obtain a longer passage, and thus a proportionately greater restriction upon fluid flow through the passage, than if the passage were radial. The length of the passage can be adjusted by changing the pitch of the spiral; and as an extreme case, when the spiral approaches infinite pitch, the passage becomes a substantially straight line between the center of the piston face and the perimeter of the piston. The cross-sectional area of the groove is adjusted to give the proper resistance for the viscosity of the fluid in conduits 10 and 11.

Since each groove 37 in cooperation with an end wall 20 or 21, as the case may be, forms a restricted passage through which fluid may flow, it follows that grooves 37 may be likewise cut in the end walls of the body section. However, it is preferred, for various reasons, that they be formed in the end surfaces of pistons 30 and 31.

As may be seen in Fig. 3, the two pistons 30 and 31 are hexagonal in cross section. Each piston engages the inner cylindrical surface of bore 18 at a plurality of spaced points, as at 38, to guide the piston at its axial movement. However between each line of contact 38, there is a substantial clearance between the wall of bore 18 and the flat side wall of the piston, as at 40. The area of each of the several fluid passageways 40 is about the same as the minimum cross-sectional area of a bore 24 or 25; so in the aggregate passageways 40 may be considered as permitting comparatively unrestricted fluid flow between the piston and the side walls of the cylinder. Passages 40 beside one piston communicate with the passages 40 beside the other piston so that comparatively unrestricted fluid flow is possible throughout the length of internal chamber 18. It is of course clear that other shapes of non-circular pistons may be used instead of the hexagonal shape illustrated.

Each piston 30 and 31 has an internal fluid passage extending entirely through it, such passage forming a secondary fluid passage that is entirely separate from the primary fluid passage described above. This secondary fluid passage within each piston is in two separate sections, one section being of relatively large diameter and the other of relatively small diameter. In pinion 30, the large diameter section is represented by large bore 42 and the smaller section by small bore 43 which is located centrally of the piston and in a position to register with the inner end of passage 24. In piston 31, the large diameter section of the internal passage as indicated at 44 and the smaller section at 45, the latter opening at the center of end face 33 in a position to register with the inner end of passage 25.

Within each of the pistons is a temperature responsive element which controls the flow of fluid through the secondary fluid passage within the piston in response to surrounding temperatures. This temperature responsive element is provided in the form of a plug 48 located within each of the larger sections 42 and 44 of the secondary passage. Each plug 48 is a body of material having a comparatively high coefficient of thermal expansion so that it expands and contracts at a rate greater than the portion of the piston surrounding it. For this purpose, any material having a suitably high coefficient of thermal expansion may be used, but as an example of a particularly satisfactory material, one of the synthetic resins, commonly termed plastics, has been used. A tetrafluorethylene polymer, ordinarily known in the trade by the name "Teflon" has physical and chemical characteristics making it particularly suitable for this purpose.

The plug 48 is made of substantially the same external diameter as the internal diameter of bores 42 and 44 so that the plug completely closes the bores at ordinary temperature. The expanded plug prevents flow of liquid through the secondary passages within the pistons. However, when the fluid passing through the snubber reaches a temperature of about −20° F., the plug contracts sufficiently to begin to allow limited fluid flow around the plug between its periphery and the complementary wall of cylinder bore 42 or 44. The contraction of the plug relative to the cylinder increases with a further drop in temperature. As the temperature of the liquid in the snubber decreases its viscosity increases. With decreasing temperature the clearance at 53 between the plug and the wall of cylinder bore 42 or 44 increases, the increase being approximately at a rate sufficient to offset the increase in viscosity. As a result, at low temperatures, for example in the range −20° to −65° F., there is a distinct but restricted flow of fluid through the secondary passage in each of the pistons represented by bores 42 and 43 in the case of piston 30 and bores 44 and 45 in the case of piston 31.

In order to prevent the plug 48 from sealing this secondary fluid passage by engagement with the transverse end wall at the junction of bores 42 and 43, for example, the abutting end face of the plug may be provided with one or more grooves 50, as shown particularly in Fig. 5. These grooves are always open and permit fluid flow across the end face of the plug. Any other means for preventing a seal at this location may be used.

Since at ordinary temperatures the outside diameter of each plug is substantially the same as the internal diameter of the bore at which the plug is located, the plug retains its position under ordinary temperatures because of frictional engagement between its circumferential surface and the surrounding piston. However, at lower temperatures, the plug is free to move like a piston in a cylinder. The two plugs are held in position by spring 52 which bears at its opposite ends against the opposing inner faces of the two plugs 48. The thrust of the spring keeps the plugs seated at the ends of bores 42 and 44 at lowered temperatures. The thrust of the spring is also transmitted through the plugs to pistons 42 and 44 so that the pistons are normally urged toward the ends of internal chamber 18 in the positions shown in Fig. 2. This is the normal position in which the abutting faces 20 and 32 of the body and piston respectively are in contact and likewise the corresponding faces 21 and 33 at the other end of the body are in contact.

At ordinary temperatures, each temperature responsive plug closes the associated secondary fluid passage through each of the pistons so that the pistons and the snubber in its entirety operate exactly as if this secondary internal passage did not exist through each piston. The operation of this device is described in greater detail in the forementioned copending application Serial Number 402,964.

Assume that fluid under pressure enters the snubber through passage 24, as a result of a surge in fluid pressure. Movement of fluid into the end of the snubber moves piston 30 to the right, as shown in Fig. 4, moving end walls 32 of the piston away from end wall 20 on the body of the snubber. Fluid now flows freely into and then through chamber 18 by flowing through one or more of the several passages 40 which extend longitudinally of the chamber at the flat sides of pistons 30 and 31. Thus fluid reaches the outer end of spiral 37 in the end face of piston 31. Spiral groove 37 is covered by engagement with the cooperating face 21 of the end wall of chamber 18 to form a fluid passage, and fluid flowing through the passage is subjected to a comparative restriction on its flow. Fluid leaves the restricted passage at the inner end of the spiral where the fluid enters passage 25 and again flows freely out of the pressure snubber. This constitutes a primary flow path which is continuously open.

At temperatures sufficiently low to contract plugs 48 and open up the secondary fluid passage within each piston, fluid flows over the same primary path just described but in addition thereto, fluid flow also takes place over the secondary path. Fluid from passage 24 enters piston 30 by passageway 43, as shown especially in Fig. 6, then travels radially through one or more grooves 50 of plug 48 until it reaches the annular restricted passage formed by clearance 53 between plug 48 and the inside of the piston wall. In this passage, liquid flow is, comparatively speaking, restricted. It flows past the plug and out the open end of large bore 42 of the piston into large bore 44 of the adjoining piston 31. Liquid then follows a similar path with respect to piston 31, flowing around the plug 48 in bore 44, radially inwardly through grooves 50 in the end of that plug, and then out through small bore 45 into the outlet passage 25.

This snubber is preferably constructed symmetrically so that it reacts in exactly the same manner to fluid flow in either direction through the unit. Flow in a direction assuming that bore 24 is the inlet and bore 25 is the outlet has been described. Flow in the reverse direction from bore 25 to bore 24 is restricted in the same manner, as will be understood from the foregoing description, except that under these circumstances piston 31 is moved away from wall 21 and piston 30 is maintained in engagement with wall 20. If desired, free and unrestricted flow may be had in one direction by omitting an assembly consisting of one piston and its associated temperature responsive plug 48.

In order to compensate fully for lowered temperature, it is only necessary to know the fluid with which this snubber will be used and its increase in viscosity as its temperature decreases. From this information, the material for plug 48 can be selected and the size of the several fluid passages can be so designed that the total restriction on fluid flow through the snubber decreases at approximately the rate required to compensate for the increased viscosity of the fluid. Thus, the time required for a pressure surge to be transmitted through the snubber can be maintained substantially independent of the temperature at which the snubber is operating.

From the foregoing description it will be apparent that changes in the exact shape, arrangement, and location of various parts of my improved snubber may occur to persons skilled in the art without departing from the spirit and scope of my invention. Accordingly, it is to be understood that the foregoing description is considered as being illustrative of, rather than limitative upon, the appended claims.

I claim:

1. In a temperature compensated fluid flow regulating device the combination comprising: a body having an internal chamber with an opening at each end for fluid entering and leaving the chamber; a hollow member having a passage extending entirely through it and reciprocable within the chamber, said member having an exterior surface which cooperates with a complementary wall of the chamber to define a primary fluid passage providing a comparatively restricted flow of fluid through the body at all temperatures; a plug of material having a relatively high coefficient of thermal expansion located within said hollow member, said plug normally closing the passage through said hollow member but contracting at lowered temperatures sufficiently to permit restricted fluid flow through said hollow member; and means holding said plug in position when contracted.

2. In a temperature compensated fluid flour regulating device, the combination comprising: a body having an internal chamber with an opening at each end for fluid entering and leaving the chamber; a pair of pistons slidable within the chamber and each having an exterior surface cooperating with a complementary surface of the chamber to define a primary restricted fluid passage of substantially uniform cross-sectional area at all temperatures for flow of fluid through the body, each piston also having an internal passage defining a separate secondary fluid passage; a plug of material having a relatively higher coefficient of thermal expansion than the pistons in the internal passage of each piston, said plug closing the associated internal piston passage at ordinary temperatures but contracting sufficiently at lowered temperature to permit restricted fluid flow through the piston passage; and spring means bearing against each plug to keep it seated when contracted and to urge the associated piston toward the end of the chamber.

3. In a temperature compensated fluid flow regulating device the combination comprising: a body having an internal chamber with an opening at each end for fluid to enter and to leave the chamber; means within the chamber defining a first continuously open fluid passage providing a primary fluid path through the body; and means within the body defining a second fluid passage providing a secondary fluid path of variable resistance to fluid flow through the body, said last mentioned means including a temperature responsive element which reduces resistance to fluid flow through said second passage at lowered temperatures.

References Cited in the file of this patent
UNITED STATES PATENTS

| | | |
|---|---|---|
| 2,364,820 | Rosander et al. | Dec. 12, 1944 |
| 2,372,408 | Trich | Mar. 27, 1945 |
| 2,511,733 | Morrison | June 13, 1950 |
| 2,610,300 | Walton et al. | Sept. 9, 1952 |